United States Patent [19]

Rumble

[11] Patent Number: 4,473,205
[45] Date of Patent: Sep. 25, 1984

[54] PIPE HANGER
[75] Inventor: Ray M. Rumble, Canfield, Ohio
[73] Assignee: Michigan Hanger Company, Inc., Hubbard, Ohio
[21] Appl. No.: 407,587
[22] Filed: Aug. 12, 1982

Related U.S. Application Data

[63] Continuation-in-part of Ser. No. 257,599, Apr. 27, 1981, abandoned.

[51] Int. Cl.³ .............................................. F16L 3/00
[52] U.S. Cl. ...................................... 248/58; 248/62
[58] Field of Search .................. 248/62, 58, 59, 63, 248/316 A; 24/22, 115 G, 129 B; 411/183, 122

[56] References Cited

U.S. PATENT DOCUMENTS

| 1,579,418 | 4/1926 | Tomkinson | 248/62 |
| 2,851,823 | 9/1958 | Peterson | 248/62 |
| 2,996,274 | 8/1961 | Marik et al. | 248/62 |
| 3,177,542 | 4/1965 | James | 248/63 |
| 4,166,600 | 9/1979 | Perjes | 248/62 |

FOREIGN PATENT DOCUMENTS 592837 11/1977 Switzerland .......................... 248/62

Primary Examiner—William H. Schultz
Assistant Examiner—Ramon O. Ramirez
Attorney, Agent, or Firm—Harpman & Harpman

[57] ABSTRACT

A pipe hanger is disclosed consisting of a distortable strap for positioning about a pipe to be supported, the ends of the strap being shaped to engage the opposite sides of a threaded support rod and an apertured spring clip movable when in a first distorted shape coaxially of said support rod over said ends of said strap so as to forcefully engage said ends against said support rod when said spring clip assumes its normal shape.

6 Claims, 4 Drawing Figures

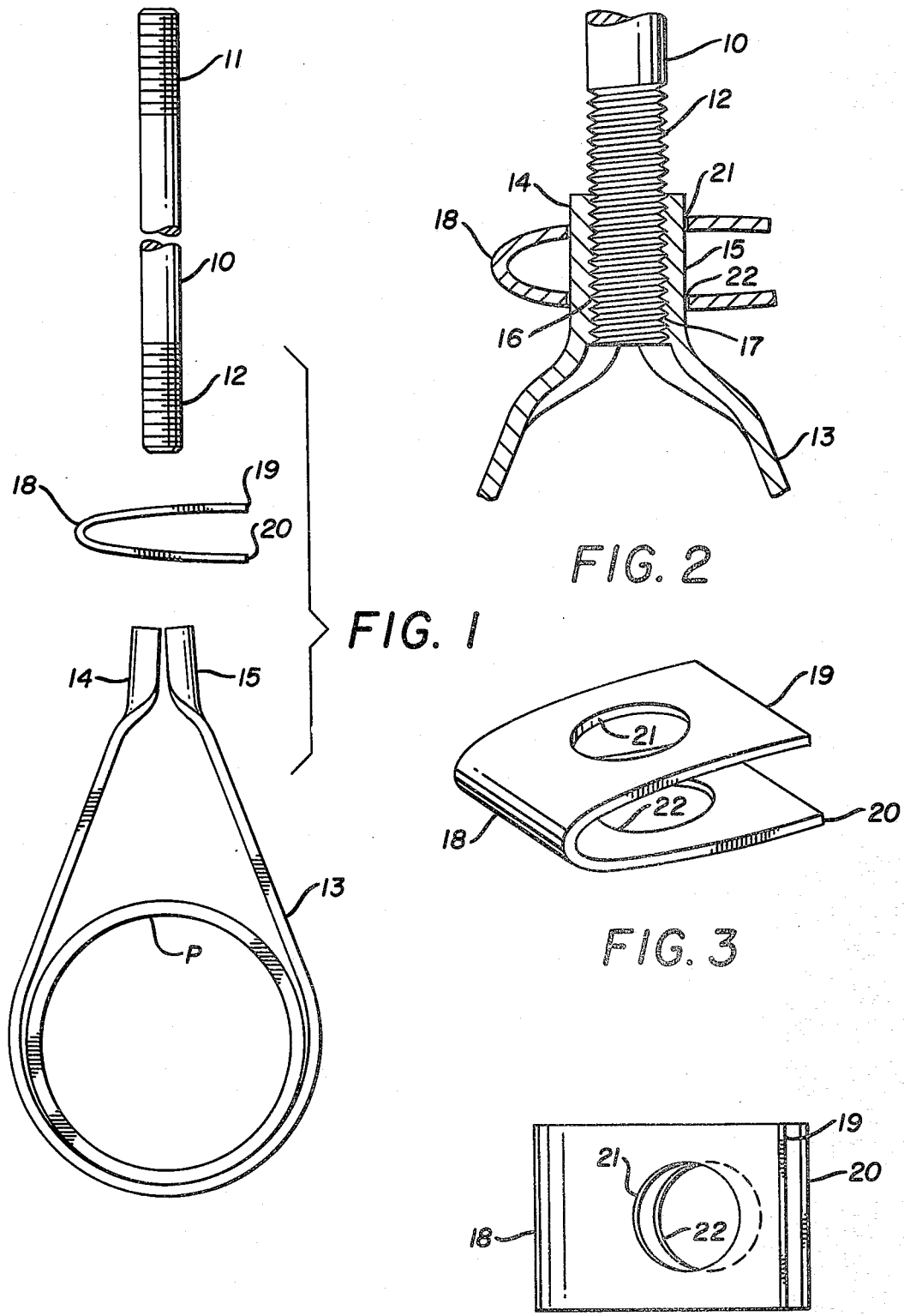

PIPE HANGER

This is a continuation in part of my patent application Ser. No. 257,599, filed Apr. 27, 1981 now abandoned.

BACKGROUND OF THE INVENTION (1) Technical Field:

This invention relates to pipe hangers of the type normally employed to suspend pipes from overhead supports in spaced relation thereto.

(2) Description of the Prior Art:

Prior structures of this type have generally taken the form of a band arranged in an oval shape with its ends apertured and arranged in superimposed position over a flanged cylindrical coupling which in turn is internally threaded for threaded engagement with a supporting rod and as illustrated in U.S. Pat. No. 2,996,274.

Proposals have been made to alter the usual pipe hanger constructions by clampingly engaging the pipe carrying portion of the pipe hanger on a supporting rod or on a fastener carried by a supporting rod and such constructions may be seen in U.S. Pats. Nos. 476,227, 1,392,810, 1,870,651, 1,924,353, 3,493,206, and 4,306,696.

Swiss Pat. No. 592,837 discloses a strap which can be positioned around a pipe and its ends arranged in oppositely disposed relation on the sides of the threaded rod with a tubular member positioned thereover and held in desired position by a threaded nut engaging the threaded rod.

The present invention differs from the prior art in providing a simple structure which is less expensive to manufacture and is easier to install than the prior art devices and particularly in the use of an apertured spring clip positioned over over the end configurations of the band in the areas where they engage the threaded rod to form a locking device which may be quickly and easily installed and/or removed.

SUMMARY OF THE INVENTION

An improved pipe hanger is disclosed which is formed of only two pieces which are engagable with a threaded support rod to form a complete pipe hanger. The pieces comprise an elongated band such as formed of sheet metal or metal strapping with end configurations defining half circular shapes and internally threaded or knurled and arranged to be positioned against the outer opposite sides of a threaded support rod and wedged thereagainst by the application of an apertured spring clip to lock the assembly in desired pipe supporting position.

DESCRIPTION OF THE DRAWINGS

FIG. 1 is an exploded front elevational view with parts broken away illustrating a pipe, a pipe hanger and a supporting rod;

FIG. 2 is an enlarged cross section of a portion of an assembly of the pipe hanger seen in FIG. 1 with parts broken away;

FIG. 3 is a perspective view of the spring clip seen in FIGS. 1 and 2; and

FIG. 4 is a top plan view of the spring clip of FIG. 3.

DESCRIPTION OF THE PREFERRED EMBODIMENT

By referring now to FIGS. 1 and 2 of the drawings, it will be seen that a supporting rod 10 having threaded end sections 11 and 12 respectively thereon is illustrated and those skilled in the art will observe that such supporting rods are common in the pipe hanger art and are usually affixed at their upper ends to an overhead support such as a beam or the like usually by way of a clamp, not shown. An elongated sheet metal strap 13 comprises the portion of the hanger which is positioned around a pipe P to be suspended thereby. The elongated strap 13 has its end portions 14 and 15 respectively, shaped in substantially half circular arcuate configurations with representations of thread patterns 16 and 17 or the like formed on their inner opposed surfaces. An apertured spring clip 18 consists of a section of an elongated resilient metal member bent into a V-shape with arms 19 and 20. Apertures 21 and 22 in the arms 19 and 20 are arranged to register with one another when the arms 19 and 20 are moved against the resiliency of the metal member to a first position adjacent one another. In such first position, the apertured spring clip 18 may be moved from a position where the supporting rod 10 is positioned through the apertures 21 and 22 in the spring clip 18 downwardly and over the end portions 14 and 15 of the elongated strap 13 when they are engaged on the lower portion 12 of the supporting rod 10 as best seen in FIG. 2 of the drawings. Releasing the arms 19 and 20 of the apertured spring clip 18 causes the same to move to a second position as best seen in FIGS. 2 and 4 of the drawings where the apertures 21 and 22 move out of registry and sharply frictionally engage the outer surfaces of the end portions 14 and 15 of the elongated strap 13 of the pipe hanger. The frictional engagement of the metal defining the edges of the apertures 21 and 22 is substantially improved by their angular relationship with respect to the outer surfaces of the end portions 14 and 15 of the elongated strap 13 as the same bite into the outer surfaces of the end portions 14 and 15 and lock the apertured spring clip 18 securely in position as shown in FIG. 2 of the drawings where it continuously exerts tension holding the end portions 14 and 15 of the elongated strap 13 tightly against the threaded lower portion 12 of the supporting rod 10 and thereby conveniently and satisfactorily supporting the pipe P therebelow.

In FIG. 1 of the drawings, the apertured spring clip 18 is shown in substantially its first position, the arms 19 and 20 having been moved toward one another to bring the apertures 21 and 22 into substantial vertical registry so that when the elongated strap 13 is positoned about the pipe P and the ends 14 and 15 of the strap moved into engagement with the opposite sides of the lower threaded end portion 12 of the supporting rod 10, the apertured spring clip 18 may then be moved downwardly over the ends 14 and 15 and released whereupon it will assume its locking position as generally indicated in FIG. 2 of the drawings.

In FIG. 3 of the drawings, the apertured spring clip 18 is shown in substantially its first position with the apertures 21 and 22 in substantial vertical registry as necessary in the installation or removal of the clip from the assembly and in FIG. 4 of the drawings, the top plan view of the apertured spring clip 18 shows the arms 19 and 20 in their second position where the arms 19 and 20 have moved away from one another and the apertures 21 and 22 are out of registry and in the locking position shown in FIG. 2 of the drawings.

It will thus be seen that a simple, inexpensive, and highly practical pipe hanger has been disclosed which is easily formed of inexpensive materials very easily handled in the field in installing pipes and the like and that such installation is quick and easy with the two movable parts of the pipe hanger becomming locked together upon the final positioning of the two parts of the pipe hanger, all as hereinbefore set forth.

Although but one embodiment of the present invention has been illustrated and described, it will be apparent to those skilled in the art that various changes and modifications may be made therein without departing from the spirit of the invention.

Having thus described my invention, what I claim is:

1. An improvement in a pipe hanger, which pipe hanger includes a strap to be positioned about a pipe to be suspended the end of the strap arranged to be moved to positions adjacent one another and secured to a threaded support rod, the improvement comprising means for securing said ends of said strap to said threaded support rod, said means consisting of end portions on said strap shaped to engage the opposite sides of said threaded support rod, and a spring clip having a pair of apertures therein and arranged to be moved co-axially of said support rod over said end portions of said strap in a first position with said apertures in registry with the axis of said support rod, said apertured spring clip formed of resilient material normally urging said spring clip to a second position with said apertures out of registry with said axis of said support rod.

2. The improvement in a pipe hanger as set forth in claim 1 and wherein said spring clip consists of a section of resilient material in a V-shape defining arm portions, an aperture in each of said arm portions spaced with respect to the apex of said V-shape, the outer ends of said arm portions normally spaced substantially with respect to one another, said arm portions of said V-shape being distortable against the resiliency thereof to a position adjacent one another whereby said apertures are in substantial registry with one another enabling the spring clip to be positioned on said threaded support rod and moved over said end portions of said strap so that upon said arm portions resiliently moving toward their normally spaced positions, said apertures move out of said registry and the areas of said arm portions defining said apertures engage said end portions to hold the same against said threaded support rod.

3. The improvement in a pipe hanger set forth in claim 1 wherein said spring clip is generally V-shaped with said apertures in the arms of said V-shape.

4. The improvement in a pipe hanger as set forth in claim 1 wherein said spring clip is generally V-shaped with said apertures in the arms of said V-shape and wherein said apertures are circular.

5. The improvement in a pipe hanger as set forth in claim 2 wherein said section of resilient material is an elongated section of flat spring metal.

6. The improvement in a pipe hanger set forth in claim 5 and wherein said spring clip is generally V-shaped with said apertures in the arms of said V-shape and wherein the apex of said V-shape is formed on a radius between said arms.

* * * * *